United States Patent

[11] 3,599,525

[72] Inventor Paul A. Klann
P.O. Box 2398, Waynesboro, Va. 22980
[21] Appl. No. 37,242
[22] Filed May 14, 1970
[45] Patented Aug. 17, 1971

[54] PNEUMATIC CROSSBAR DEVICE
6 Claims, 18 Drawing Figs.
[52] U.S. Cl. .................................................. 84/331,
84/335, 84/342, 137/594, 137/608, 200/83 B,
235/201 R, 251/5
[51] Int. Cl. ...................................................... G10b 1/00,
H01h 35/40, F16l 55/14
[50] Field of Search .......................................... 84/331-
—336, 338—345; 251/5, 6; 137/594, 608, 625.66

[56] References Cited
UNITED STATES PATENTS
3,468,342 9/1969 Craft ............................ 251/5 X
3,521,670 7/1970 Johnston ..................... 251/6 X
3,529,106 9/1970 Little ............................ 200/83 B OTHER REFERENCES
IBM Technical Disclosure Bulletin, Vol. 6, No. 10, March 1964, p. 15.

Primary Examiner—Richard B. Wilkinson
Assistant Examiner—John F. Gonzales
Attorney—Sughrue, Rothwell, Mion, Zinn & Macpeak ABSTRACT: A pneumatic crossbar device includes a plurality of flexible inflatable tubes positioned on two levels with the tubes in each level being spaced apart and parallel to one another and with the tubes of each level lying at right angles to and adjacent the tubes of the other level. Each tube of the crossbar device is sealed at one end and the other end is connected to an individually operated valve for controlling the supply of air pressure to the tube. Each tube may be individually inflated or deflated by actuating the valve connected thereto, thereby presenting a matrix of crossover points which may be used to actuate switches, operate valves, or apply pressure at selected intersections of the tubes. Three different cross-sectional dimensions may be obtained at each intersection by selectively deflating both tubes, inflating one tube and deflating the other tube, or by inflating both tubes.

PATENTED AUG 17 1971

INVENTOR
PAUL A. KLANN

BY Sughrue, Rothwell, Mion, Zinn & Macpeak

ATTORNEYS

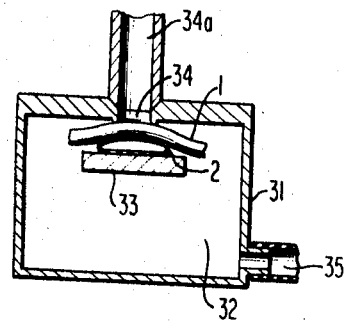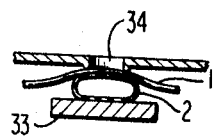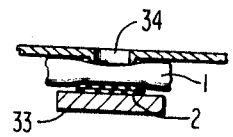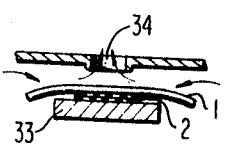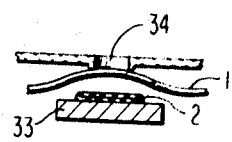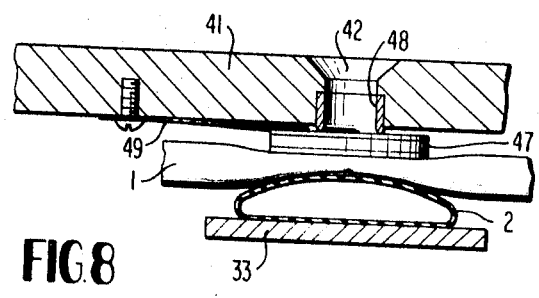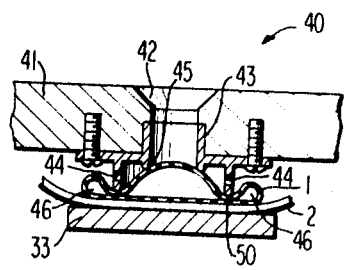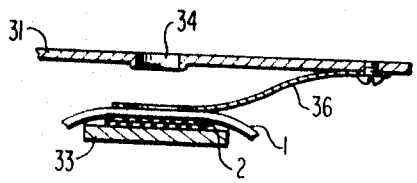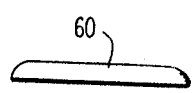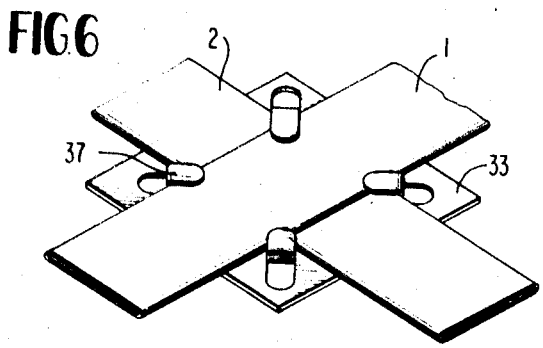

3,599,525

PNEUMATIC CROSSBAR DEVICE

BACKGROUND OF THE INVENTION

1. Field of the Invention

This invention pertains broadly to a pneumatic crossbar device providing a matrix of control points adapted for manual or programmed operation.

More specifically, the pneumatic crossbar device may be applied to the music field for use in pneumatically operated organs, in which the intersections of the crossbar matrix are positioned at each opening of a pressurized air chamber to control the flow of air to the individual pipes of the organ.

The pneumatic crossbar device may also be used in the area of machine control, wherein the individual valves may be adapted for programmed control and a multiposition switch may be located at each intersection of the tubes for selective actuation by a predetermined inflation and deflation of preselected tubes.

The pneumatic crossbar device may also find use in the therapeutic field as a support for applying pressure at selected points of the human anatomy either in the static mode or according to a predetermined sequence.

2. Description of the Prior Art

In the prior art it is known to utilize a plurality of tubes which are positioned parallel to each other and which may be inflated in a predetermined sequence by operating the control valves. These devices are used primarily in the therapeutic field or are adapted to be used in air mattress structures for applying pressure to a predetermined part of the human body. With the prior art devices it is impossible to obtain selective point control by individually controlling the inflation of the individual parallel tubes. In the field of pneumatically operated musical organs, it is known to utilize a single inflatable tube for controlling each opening in the air chest of a pneumatically operated organ, however, the use of a pneumatically operated tubular crossbar matrix has not been used previously.

SUMMARY OF THE INVENTION

The present invention utilizes a plurality of individually controlled flexible pneumatic tubes disposed at right angles to each other for obtaining a plurality of cross section dimensions at each intersection of the tubes, whereby the various composite tube dimensions can be utilized to control a variety of devices such as multipositioned electrical switches and the openings in the pressure chest of pneumatic organs.

Although the present invention is designed primarily to be utilized as a control means for pneumatic organs, it is not limited to this specific application, but may be used in any application which requires a plurality of signals to be obtained from a programmed or selectively operable matrix structure.

The present invention provides a simple, inexpensive matrix structure which provides a plurality of signals which may be utilized directly or indirectly. The present invention provides a matrix system which is quick, reliable and economical in operation.

BRIEF DESCRIPTION OF THE DRAWINGS

FIGS. 4A—4E show the subject invention in a typical installation in a pneumatically operated organ and the various positions of the tubes for controlling the flow of air therein.

FIG. 5 shows an application of a spring for assisting the deflation of the tubes of the subject invention.

FIG. 6 shows one specific means for retaining the tubes on the rigid support of FIG. 4A.

FIG. 7 shows an embodiment of a valve means used in conjunction with an intersection of the tubes.

FIG. 8 shows a further embodiment of a valve means in conjunction with an intersection of the tubes.

FIGS. 9A and 9B show a modified embodiment of the tube construction.

DETAILED DESCRIPTION OF THE INVENTION

This invention relates to a pneumatic crossbar device for selectively obtaining various cross-sectional dimensions at the intersections of selected tubes in order to obtain a matrix-type control means. The preferred embodiment of the invention is shown as used in a pneumatically operated organ control system, but may be readily applied to other areas requiring a matrix control.

Figure 1:
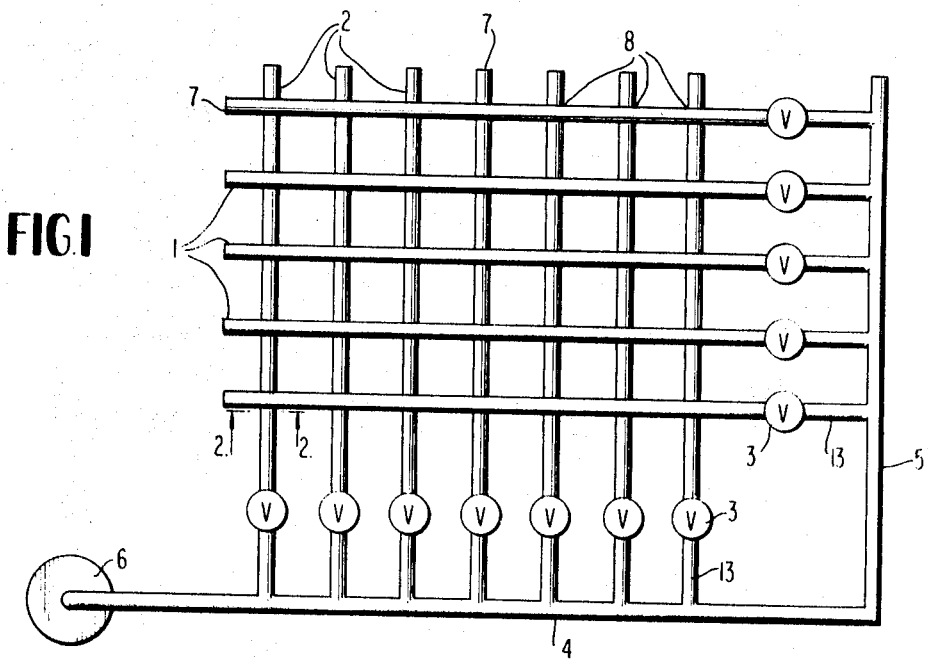
FIG. 1 is a top plan view of a preferred embodiment of the invention.
Figure 2A:
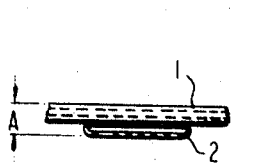
FIGS. 2A—2D are cross-sectional views taken at an intersection of the tubes in FIG. 1 showing the various cross-sectional dimensions obtained by selective inflation of the tubes.
Figure 3:
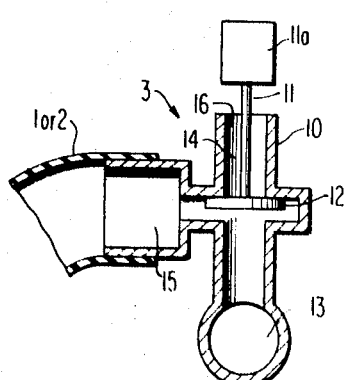
FIG. 3 shows one example of a typical valve which may be used to control the inflation of an individual tube.

In the preferred embodiment as shown in the plan view of FIG. 1, a plurality of flexible inflatable tubes 1, constructed from any suitable material such as plastic, rubber or the like, are positioned parallel to one another in a spaced-apart relationship in a common plane. A second set of flexible, inflatable tubes 2 are positioned parallel to one another and located in a second common plane adjacent and parallel to tubes 1. As seen in FIG. 1, tubes 2 are positioned at right angles to the tubes 1. The tubes 1 and 2 are constructed in such a manner that they will lie in a flattened position as shown in FIG. 2A when deflated and will assume a round or oval shape when inflated. One end 7 of each tube is sealed and the other end one is connected to an individual pneumatic flow control means such as a valve 3. These flow control means 3 may be manually operated or solenoid-controlled valves, as shown in FIG. 3. Also, a fluidic amplifier or diode may be installed in each supply line to selectively control the inflation and deflation of the tubes 1 and 2. The flow control devices 3 are, in turn, connected to air-distributing means or headers 4 and 5, which, are in turn, connected to a source of pneumatic pressure 6, such as an air compressor.

Figure 2B:
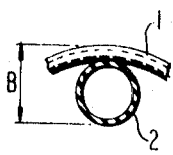
Figure 2C:
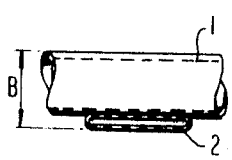
Figure 2D:
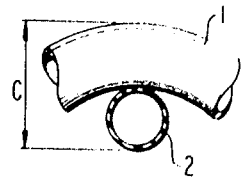

Referring now to FIGS. 2A—2D, various selected positions or cross-sectional dimensions may be obtained by selectively inflating and deflating the proper tubes. By selectively operating the fluid flow control means 3, both of the tubes at a particular intersection may be deflated to obtain a first cross-sectional dimension A, as seen in FIG. 2A. By selectively inflating one of the tubes while maintaining the other tube in its deflated state, a second, or intermediate cross-sectional dimension B may be obtained. This position is shown in FIGS. 2B and 2C. In FIG. 2B, lower tube 2 is inflated while upper tube 1 is maintained in its deflated state, thus attaining the intermediate dimension B, while in FIG. 2C the lower tube 2 is deflated, while the upper tube 1 is inflated. FIG. 2D shows the third, or greatest dimension C which may be obtained by inflating both of the intersecting tubes 1 and 2. Thus, it may be seen that three separate control positions determined by the cross-sectional dimensions may be obtained by selective inflation and deflation of the proper tubes. These control positions may be obtained at each of the intersections 8 of the tubes 1 and 2, shown in FIG. 1.

FIG. 3 shows an example of a typical control valve which may be used to control the inflation and deflation of tubes 1 and 2. Control valve 3 utilizes a valve body 10, which has a bore 14 therethrough. One end of bore 14 is in communication with a pressurized conduit 13, while the other end of bore 14 is open to the atmosphere, as at 16. Pressurized conduit 13 is connected to the source of fluid pressure 6, shown in FIG. 1 by way of the air-distributing headers 4 and 5. A connecting port 15 is positioned on valve body 10 in communication with bore 14 for connecting an inflated tube 1 or 2 with the valve control means 3. A valve disk 12 controlled by valve stem 11 extending out of the open end of bore 14, is positioned within bore 14 for controlling the flow of pneumatic pressure to tubes 1 or 2. The valve disk 12 is constructed in such a manner that, upon depressing stem 11, by an electric solenoid 11a, by manual means or other actuating means well known to one skilled in the art, the flow of pneumatic pressure from conduit 13 is shut off from tubes 1 or 2, and the tube is vented to the atmosphere.

The application and operation of the present invention as used in a pneumatically operated pipe organ will now be described. As shown in FIG. 4A, the organ utilizes a sealed housing 31 having a pneumatic chamber 32 therein. Pneumatic chamber 32 is connected to a source of pneumatic pressure (not shown) by a conduit 35. A plurality of ports or openings 34 are on the top of housing 31 and each opening 34 communicates with a pipe 34a of the pipe organ in a conventional manner known to one skilled in the art. Each intersection of the tubes 1 and 2 is positioned within chamber 32 below an opening or port 34. The tubes 1 and 2 are held in position by a stationary or rigid support member 33, secured to housing 31 by any suitable means.

Chamber 32 is normally pressurized at a given pneumatic pressure by means of a pressure source connected to port 35. Flexible pneumatic tubes 1 and 2 are pressurized by a pneumatic pressure that is higher than the pressure delivered to chamber 32, thus causing opening 34 to be sealed due to the expansion or ballooning of pneumatic tubes 1 and/or 2. When tube 1 is collapsed, as shown in FIG. 4B, due to actuation of the particular valve controlling this tube 1, the other tube 2 will expand further to fill the void caused by the collapse of tube 1 thereby maintaining port 34 closed. By means of a fluidic diode or other fluid control device known in the art, the exhaust of tube 1 can be controlled at a slower rate than the inrushing pneumatic pressure to tube 2, thus assuring continuity of the seal closing opening 34. FIG. 4C illustrates the results of the same operation with tube 2 deflated and tube 1 inflated due to the operation of particular valves in the crossbar assembly. FIG. 4D illustrates the manner in which a particular pipe of an organ is played by allowing the escape of pneumatic pressure from chamber 32 through port or opening 34. This is accomplished by actuating the individual valves in such a manner as to collapse both of the tubes 1 and 2 at a particular intersection 8 to allow the tubes to move away from the sealing surface of port 34. This can be accomplished by programming an AND condition in a fluidic diode circuit or similar device.

In order to accomplish the operation shown in FIG. 4D, it is necessary to attach tubes 1 and 2 to the rigid support 33. If the tubes are unattached, the condition shown in FIG. 4E might result, wherein tube 1 or both of the tubes 1 and 2 will be forced against the sealing surface of port 34, due to the pressure differential between the atmosphere and the chamber 32.

Several different means for securing tubes 1 and 2 to the rigid support 33 are shown in FIGS. 5 and 6. In FIG. 5, a flat spring 36 is attached to the top wall of housing 31 and is biased in a downward direction with a force greater than the pressure differential exerted on the area of port 34 created by the difference between the pressure in chamber 32 and the atmosphere. Spring 36 has an opening that is sufficiently large to prevent contact between the spring and the valve seat at the port 34.

FIG. 6 illustrates another means for retaining the flexible pneumatic tubes 1 and 2 against the rigid support member 33. In FIG. 6, rigid support member 33 is constructed from a metal stamping or punching, having ears 37 which are crimped over the edges of the tubes 1 and 2 in such a manner as to hold the tubes 1 and 2 against the rigid support member 33. The rigid support member 33 may be attached to the sealed housing in any manner that is well known to those skilled in the art. The tubing may be of the type which automatically reverts to the flattened condition upon the absence of pressure therein.

FIGS. 7 and 8 illustrate additional embodiments of valve means which may be used in conjunction with the intersections of inflatable pneumatic tubes 1 and 2 to seal ports or openings 34 and which may be readily applied to pneumatically operated organs. In FIG. 7, reference numeral 40 indicates a typical cross section of an air chest in a pneumatically operated organ. The pipes (not shown) of an organ are positioned over openings 42 in the top board 41 of the air chest 40. An insert 43 is positioned at each opening 42 within the pneumatic chamber of the chest 40. The insert 43, which may be constructed of plastic, metal, or any other compatible material, has a plurality of openings 44 located around the periphery of a downwardly extending projection or lip 50. The superimposed tubes 1 and 2 are positioned between the downwardly extending lip or projection 50 of insert 43 and the rigid support member 33 in such a manner as to retain the tubes 1 and 2 in the open valve position when deflated. The inflation of tubes 1 and/or 2 over the normal pressure in the chest 40 will cause a ballooning effect so as to positively seat the upper tube 1 against a seat 45 of the insert 43, thereby preventing air from escaping from the chest 40. In addition, the ballooning 46 of the tubes 1 and 2 outside of insert 43 assures the continuity of air pressure being delivered to other valves on the same longitudinal axis of the tubes. As discussed previously, the retaining means shown in FIGS. 5 and 6 may also be incorporated into the valve seat structure of an organ chest illustrated in FIG. 7.

FIG. 8 illustrates a further embodiment of the subject invention as applied to an organ chest of a pneumatically operated organ, wherein the air pressure in the flexible inflatable tubes 1 and 2 does not have to exceed the pneumatic pressure in chamber 32. In the embodiment shown in FIG. 8, a valve disc 47, constructed of leather or other pliable material on the top surface thereof and having a piece of rigid material on the bottom side in engagement with tube 1, is used in conjunction with a valve seat insert 48 positioned at each opening 42. The valve disc assembly 47 may be cemented to the upper tube 1 and has a total area that is greater than the area represented by the valve seat insert 48. In operation, on exhausting or deflating of both tubes 1 and 2, the pressure on the area of valve disc 47 will overcome the closing pressure created by the area indicated by the insert 48, thereby causing the valve to open and allow pneumatic pressure in chamber 32 to escape through opening 42 and actuate a particular pipe of the organ. An upwardly biasing flat leaf spring 49 is used to assist the inflating pressure in tubes 1 and 2 to return valve disc 47 against valve seat 48 to block the flow of pneumatic pressure therethrough.

It is possible to control the operation of the flexible pneumatic tubes of the subject invention without the use of an air supply and a control valve, as described previously. As illustrated in FIG. 9a, tube 60 is sealed at both ends while in a partially inflated state, or condition. Upon application of pressure at one end, as for example by a roller 62 flattening one end of the tube, the remaining portion of the tube shown at 61 will expand. The source of pressure applying the roller or other device may be either manual or power assisted. Depending on how much of the tube 60 is flattened the expansion at 61 will vary to provide a plurality of control conditions. Such a tube structure may be utilized to operate valves, switches, and other devices requiring a mechanical movement as described previously.

Figure 10:
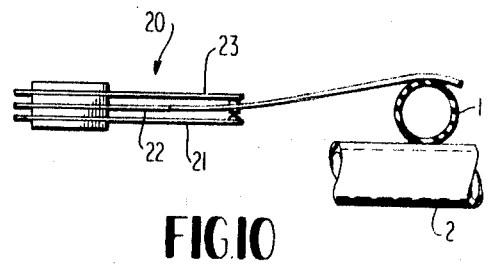
FIG. 10 shows an example of the use of the subject invention to actuate a typical multipositioned switch.

FIG. 10 shows another example of a use for the present invention wherein a multiposition electrical switch 20 is actuated by the pneumatic tubes 1 and 2. As shown in FIG. 10, contact-actuating leaf spring 22 may be biased downwardly causing the circuit between lower contact arm 21 and downwardly biased contact leaf spring 22 to be normally closed. This would correspond to vertical dimension A as shown in FIG. 2A. Upon inflation of either of the intersecting tubes 1 or 2, as shown in FIGS. 2B and 2C, an intermediate dimension B would be attained. Under such conditions an open circuit would be provided since contact leaf 22 would not contact either lower contact arm 21 or upper contact arm 23. Upon inflation of both of the tubes 1 and 2, the third dimension C would be attained, as seen in FIG. 2D, thus causing downwardly biased actuating contact leaf spring 22 to be moved further upwardly into contact with upper contact arm 23, completing the circuit therebetween. It would be obvious to one skilled in the art to adapt various other types of switches and devices requiring selective multiple positioned actuation to be controlled or actuated by the subject invention.

There may be many obvious modifications of the above-described invention, which will be apparent to those skilled in the art, and the above-described embodiments are used for illustrative purposes only. The valve disc 47 as shown in FIG. 8 may be round, square or rectangular. The valve seat 48 can have a grille network or grating included therein so as to prevent excessive ballooning of a tube into the opening 42, which might occur when utilizing larger openings and higher pressures in the system. In addition, fluids other than air can also be utilized in the present system.

Although the preferred embodiment of the subject invention is disclosed as applied to the environment of pneumatically operated organs, this does not preclude the use of the subject invention in other areas requiring the use of flexible inflatable pneumatic tubes or the use of a matrix-type control system. Such additional areas may be in the fields of physical therapy and exercising, requiring the application of pressure to specific points on a human body. Other applications of the invention may include the use of the matrix control system in machine tool programming or process control as well as in signalling devices, conveyor controls, and other areas.

What I claim is:

1. A pneumatic crossbar device comprising a plurality of inflatable flexible tubes, each tube being sealed at one end thereof, said tubes being arranged in two adjacent parallel planes with the tubes in each plane being disposed parallel to each other and at right angles to the tubes of the other plane, fluid pressure source means and a plurality of individual fluid control means fluidically connecting the other end of each of said tubes with said fluid pressure source means for selectively controlling inflation and deflation of each of said tubes to provide specific inflation characteristics at selected crossover points.

2. A pneumatic crossbar device as claimed in claim 1, further comprising a plurality of multiposition switch means positioned at the intersections of said tubes for actuation upon inflation of said tubes, a first position of said switch means being obtained when both of said tubes at an intersection are deflated, a second position of said switch means being obtained when one of said tubes is inflated and the other of said tubes at an intersection is deflated, and a third position of said switch being obtained when both of said tubes at an intersection are inflated; the inflation and deflation of said tubes being controlled by said individual fluid control means connected thereto.

3. A pneumatic crossbar device as claimed in claim 1, wherein each of said individual fluid control means comprises a valve body having a first passage therein, one end of said first passage being connected to said fluid pressure source means and the other end of said first passage being open to the atmosphere, a second passage intersecting said fluid passage in said valve body, said second passage being in fluid communication with one of said tubes, a valve disc located in said first passage and being connected to a valve stem extending beyond said valve body for selective engagement with said valve body on opposite sides of said second passage for selectively connecting said second passage with said fluid pressure source means for inflation of said tube and with said opening exposed to the atmosphere for deflating said tubes.

4. A pneumatic crossbar device as set forth in claim 3, wherein said valve stem is operatively connected to electromagnetic actuating means.

5. A pneumatic crossbar device as set forth in claim 3, wherein said valve stem is arranged for manual operation.

6. A pneumatic crossbar device for controlling the flow of air to the pipes of a pneumatically operated organ of the type having a pressurized chamber, said crossbar device comprising a plurality of flexible inflatable tubes located within said pressurized chamber of an organ, said flexible tubes being positioned in two adjacent, parallel planes with the tubes located in each plane being disposed parallel to one another and at right angles to the tubes of the other plane, the intersections of said tubes being located adjacent to and spaced from openings in said pressurized chamber, a plurality of organ pipes being positioned above the openings in said chamber for actuation by air pressure delivered through said openings, a support means positioned below said intersections of said tubes to retain said tubes adjacent said openings, the spacing between said support means and said openings being such that when both of said tubes at an intersection are deflated, communication is obtained between said chamber and the opening adjacent said intersection and when one of said tubes is inflated said opening is closed by said tubes, each of said tubes having one end thereof sealed and the other end thereof fluidically connected to individual fluid control means, actuating means for operating each of said valve means, a pneumatic pressure source means connected to said pressurized chamber and with each of said valve means for supplying pneumatic pressure to said pressurized chamber and to said flexible inflatable tubes.